United States Patent [19]
Gruenstern et al.

[11] Patent Number: 5,368,956
[45] Date of Patent: Nov. 29, 1994

[54] MULTIPLE CELL FLAT PACK BATTERY AND SHORT PROTECTION THEREFOR

[75] Inventors: Robert G. Gruenstern, Muskego; Ronald J. Bast, Greendale, both of Wis.; Julio A. Aldecoa, Santa Cruz; Lawrence F. Miller, Santa Clara, both of Calif.

[73] Assignee: Globe-Union, Inc., Milwaukee, Wis.

[21] Appl. No.: 14,626

[22] Filed: Feb. 8, 1993

[51] Int. Cl.$^5$ .............................................. H01M 4/64
[52] U.S. Cl. .................................... 429/131; 429/133; 429/153; 429/162
[58] Field of Search ................. 429/131, 133, 153, 162

[56] References Cited
U.S. PATENT DOCUMENTS
4,996,128 2/1991 Aldecoa et al. ..................... 429/153

Primary Examiner—Prince Willis, Jr.
Assistant Examiner—M. Muzzolillo
Attorney, Agent, or Firm—Foley & Lardner

[57] ABSTRACT

The present invention relates to rechargeable batteries which include cell casing components enclosing positive and negative plates, separator material and acid electrolyte. The battery includes a plurality of support members extending from one or the other of the casing components, or from both casing components, the support members passing through the plates to permit uniform compression of the internal components. In its preferred embodiment, the battery includes one or more intermediate cell partitions which permit stacking of individual cells to increase voltage. The partition continues the utilization of the support members. In another disclosed embodiment, the electrode plates contained within any particular cell are punched to permit the support members to pass therethrough, with hole sizing selected so that a small hole will remain at each support location, while also insuring that for each support member, only one of the positive and negative plates will touch it, but not both. Shorting along the support member is thereby prevented.

18 Claims, 4 Drawing Sheets

MULTIPLE CELL FLAT PACK BATTERY AND SHORT PROTECTION THEREFOR

BACKGROUND OF THE INVENTION

1. Field of the Invention

The present invention relates generally to the field of lead-acid batteries and more particularly to relatively flat, rechargeable batteries of the recombinant variety. Still more specifically, the present invention relates to structures for building higher voltage batteries from individual battery cells without interwall redundancies and for preventing shorting within the individual cells along support members contained therein.

2. Description of the Prior Art

Small rechargeable batteries are becoming increasingly important with the continuing development of portable electronic appliances, such as uninterruptible power systems (UPS). The batteries which are used with such devices are frequently referred to as flat pack batteries. It is highly desirable that such batteries be compact and light in weight yet have a high storage capacity.

Advances have been made in this technology in recent years, even using conventional lead-acid battery technology. Lead-acid batteries suffer from disadvantages relating to the weight of the plate materials (lead plates and lead-containing active materials) and the weight of the containers which are required to hold the plates and electrolyte. Lead-acid batteries, however, have very good power delivery characteristics and may be repeatedly recharged and even overcharged, with only minimal damage to the cells. Moreover, the power curve of lead-acid batteries is relatively predictable. Such features are not readily achievable with other batteries, such as nickel cadmium batteries.

One type of lead-acid battery is the recombinant battery which differs from conventional lead-acid batteries (for example, automobile batteries) in that there is no flowing electrolyte in the system. Substantially all of the electrolyte is maintained in separator material, typically made of a glass fiber mat, located between the plates. The gasses evolved during the electrochemical reactions which take place in lead-acid batteries are absorbed and recombined within the battery rather than being vented in the normal case. With such systems, the battery can be sealed and made maintenance free. Other recombinant systems still use valves to relieve any undesirable build-up of pressure within the cells of the battery.

One particularly important development in the field of recombinant lead-acid batteries is described in U.S. Pat. No. 4,996,128 issued Dec. 26, 1991 to Aldecoa and Miller entitled "Rechargeable Battery" (hereafter, the "'128 patent"). The battery described in this patent includes a thin plastic casing having generally rectangular top and bottom portions, the casing including lead foil sheets for the positive and negative plates, each foil being pasted with an appropriate active material. Separator layers are placed between the active material. Another embodiment is described, wherein a single positive plate is located at the center of the casing, while two negative plates are disposed on either side, the latter being separated from the positive plate by layers of separator material. Further embodiments are described, including multi-layer batteries of the bipolar variety.

Common features of the batteries described in this patent are the support members which extend through the plates. The support members in the illustrated embodiments are plastic pins which may extend from one or the other of the casing portions, which pass through the plates and are attached to the opposite casing portion (for example, by vibration welding). Alternatively, pin segments from each casing component may pass partially through the cell and are joined at their tips by an appropriate process such as vibration welding. The support members are provided in a pattern which insures even support and which permits even compression of the battery components when the periphery of the casing portions are sealed. Other recombinant lead-acid batteries are described in the background section of the aforementioned '128 patent. That patent is specifically incorporated herein by this reference.

While the battery described in the '128 patent represents an improvement over earlier designs of flat pack, rechargeable lead-acid batteries due to its ability to provide uniform support and compression across the battery elements, several problems still remain to be solved. One is the ability to stack individual cells to build the voltage for a final battery and another is the potential for a short to develop along the support members. The development of a flat pack, rechargeable lead-acid battery which overcomes these drawbacks would be a significant advance in this technology.

SUMMARY OF THE INVENTION

The present invention features an intermediate cell partition for permitting a plurality of individual cells to be stacked to produce higher voltage batteries. The invention further features an intermediate partition which can itself contain a plurality of plates for increasing the specific power of each individual cell. The present invention also features a system for preparing the positive and negative plates in such a way that shorting along support members is avoided. The latter feature is accomplished in the most preferred embodiment by creating alternating smaller and larger holes in the positive and negative plates at the locations where the support members penetrate the plates. Alternating the hole sizes along a particular support member results in insuring that one small hole will remain in either the positive or negative plate to insure proper support member location, while the larger hole in the opposite polarity plate will be spaced apart from the support member. Accordingly, shorting is prevented since only one of the positive and negative plates will contact the same support member, but not both.

The intermediate partition in its most preferred form includes a plurality of pin-receiving sockets on one surface and a plurality of pins on the opposite surface, the sockets and pins having a coincident axis. The partition includes a wall around the plate and extending from both sides thereof, the depth of the wall defining the area for containment of battery plates when two or more of the partitions are combined.

A battery including a plurality of individual cells is formed by providing a first outer casing portion and placing the cell components (plates and separator) within it, the first outer portion will include either sockets or the pins on its inner surface, the outside surface being generally flat. A first intermediate partition is then placed over the first outer casing portion such that the pins and sockets interact with the opposite component of the first outer portion. Coupling of the pins and sockets takes place, e.g., by vibration welding. Additional cells are created by placing cell components on the first partition and adding additional intermediate partitions one upon the other. Finally a second outer casing portion is placed over the last partition. As each step in the assembly process proceeds, joining of the periphery of the partitions and the pin support members proceeds, e.g., by vibration welding.

How these and other features of the invention are achieved will become apparent to those skilled in the art after reading the present specification.

DESCRIPTION OF THE DRAWINGS

In the various figures, like reference numerals are used to indicate like components.

DETAILED DESCRIPTION OF THE PREFERRED EMBODIMENT

Before proceeding to a detailed description of the preferred embodiment of the present invention, several general comments are in order with regard to the scope and applicability thereof. First, the electrode substrates (preferably lead foil), active materials, separator materials and electrolyte are not described in great detail in the following specification, but they can readily be selected from those well known to the art, including those described and illustrated in the '128 patent.

Second, the illustrated battery includes six cells, which could be, for example, 2 volt cells. The resulting battery would be a 12 volt, rechargeable flat pack battery. Other cell combinations could be employed without departing from the spirit or scope of the invention.

Third, the plate of the cell partitions described later herein is located at the mid-point of its surrounding wall. The partition could, however, be constructed with the plate nearer the top or the bottom of the wall.

Also, while a particular arrangement is shown for the electrode components in the battery cells, namely the configuration discussed in connection with FIG. 5 of the '128 patent, the other electrode structures shown in the '128 patent could be used and are deemed to be within the scope of the present invention. Furthermore, it should be mentioned at the outset that the preferred material for the casing and partition components is ABS (acrylonitrile-butadiene-styrene), a material commonly used in the battery art. Other moldable, thermoplastic resins (such as polycarbonates or high density polyethylene) could be substituted therefor without departing from the scope of the invention, as long as they are capable of withstanding the harsh acidic environment and the temperatures to which the type of battery would normally be exposed. Also, the particular valve arrangement described in connection with FIG. 6 should not be considered as limiting, as a wide variety of such valves are known in the battery art and, in and of themselves, the illustrated valves do not form part of the present invention.

Figure 1:
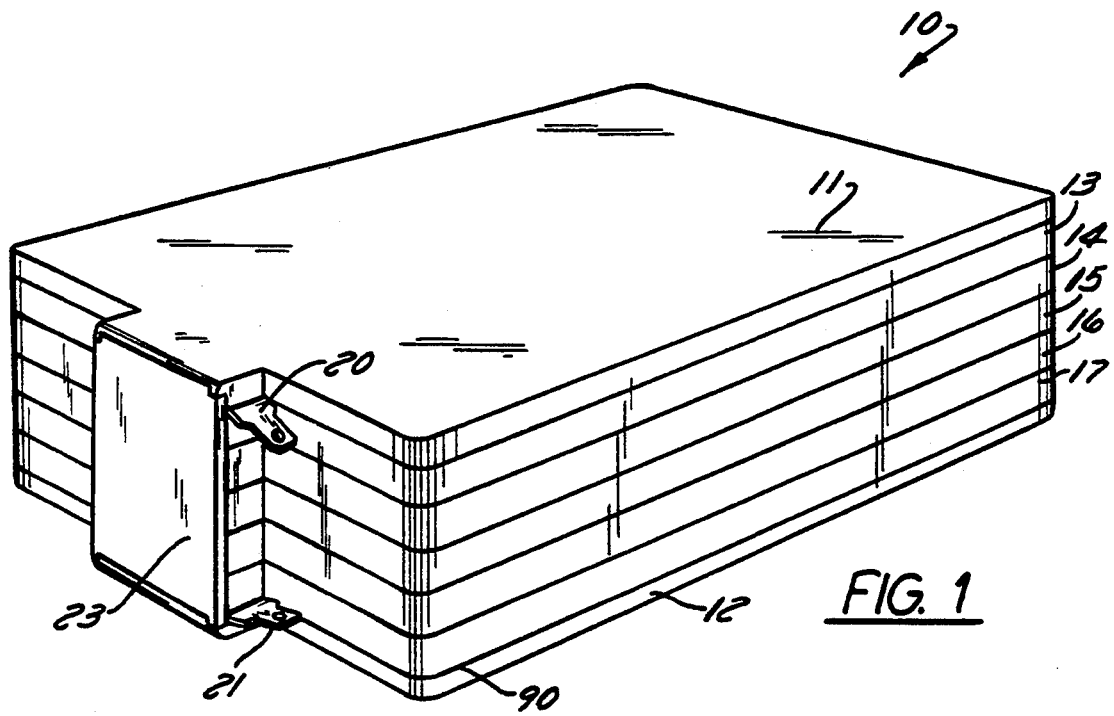
FIG. 1 is a perspective view of a six cell battery made according to the most preferred form of the present invention.

FIG. 1 illustrates a six cell battery 10 made according to the most preferred form of the present invention. Battery 10 includes a top casing element 11, a bottom casing 12 and five intermediate cell partitions 13, 14, 15, 16 and 17. Before proceeding further with the description, it should be indicated that a first cell (described later in connection with FIGS. 5 and 6) is formed between top casing 11 and the upper portion of cell partition 13, the second cell is formed between the lower portion of partition 13 and the upper portion of partition 14, etc. The sixth cell is formed between the lower portion of partition 17 and the bottom casing 12. Also shown in FIG. 1 are a pair of terminals 20 and 21, as well as a cap 23 adapted to secure vent caps and to cover the inter-cell connections which will be illustrated in subsequent drawings.

Figure 2:
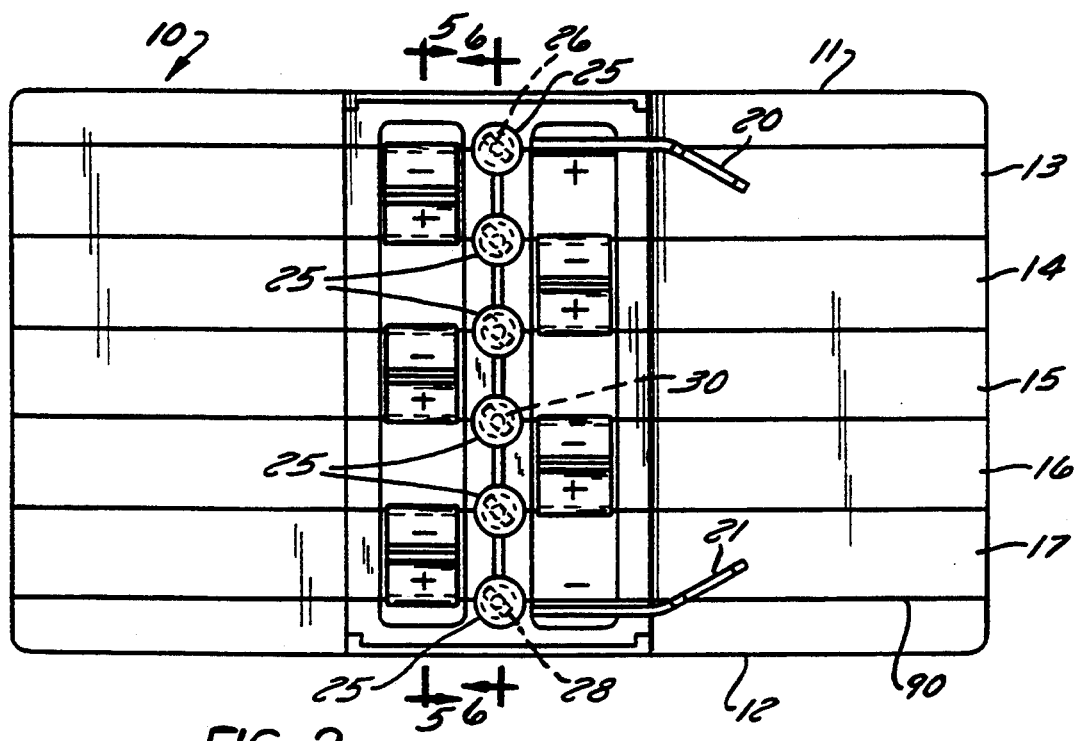
FIG. 2 is a front view of the battery shown in FIG. 1, with a cap element removed.

FIG. 2 shows the battery of FIG. 1 with cap 23 removed, and it can be seen from this figure that six rubber vent caps 25 are provided, one for each of the six cells. A slot 26 in the vent tube 28 within caps 25 is also illustrated in phantom for each of the vents, as well as the central opening 30 of the vent tube itself. The inter-cell connections are illustrated in this figure but will be best understood by reference to FIG. 5.

Figure 3:
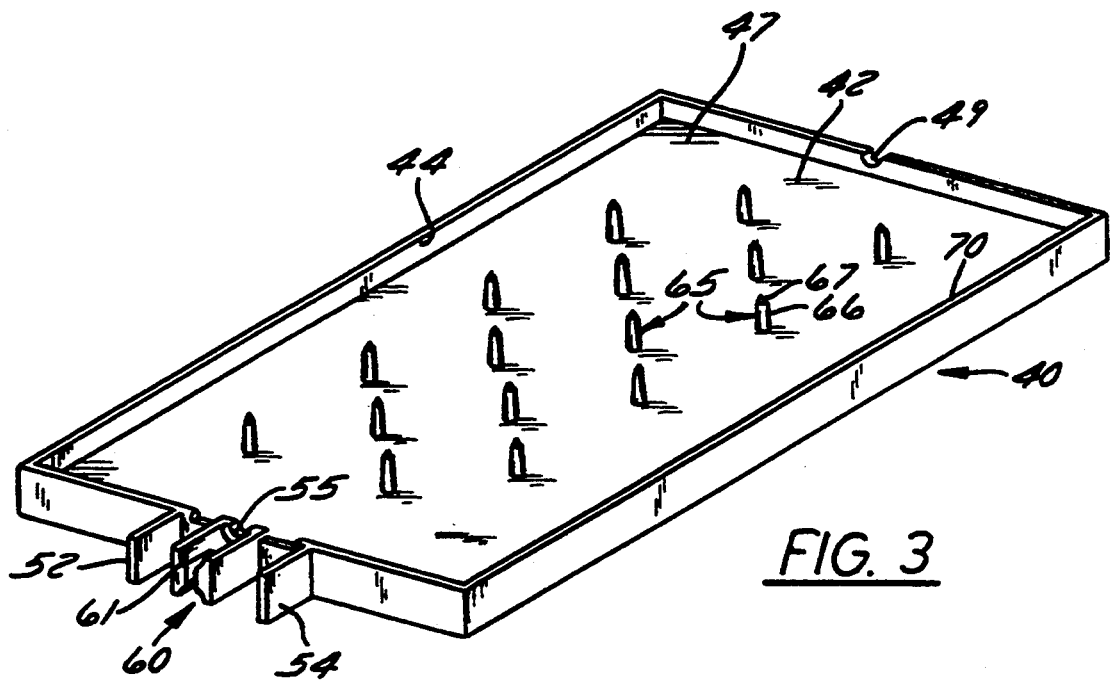
FIG. 3 is a perspective view of an intermediate cell partition useful in the present invention and illustrating the support member side thereof.
Figure 4:
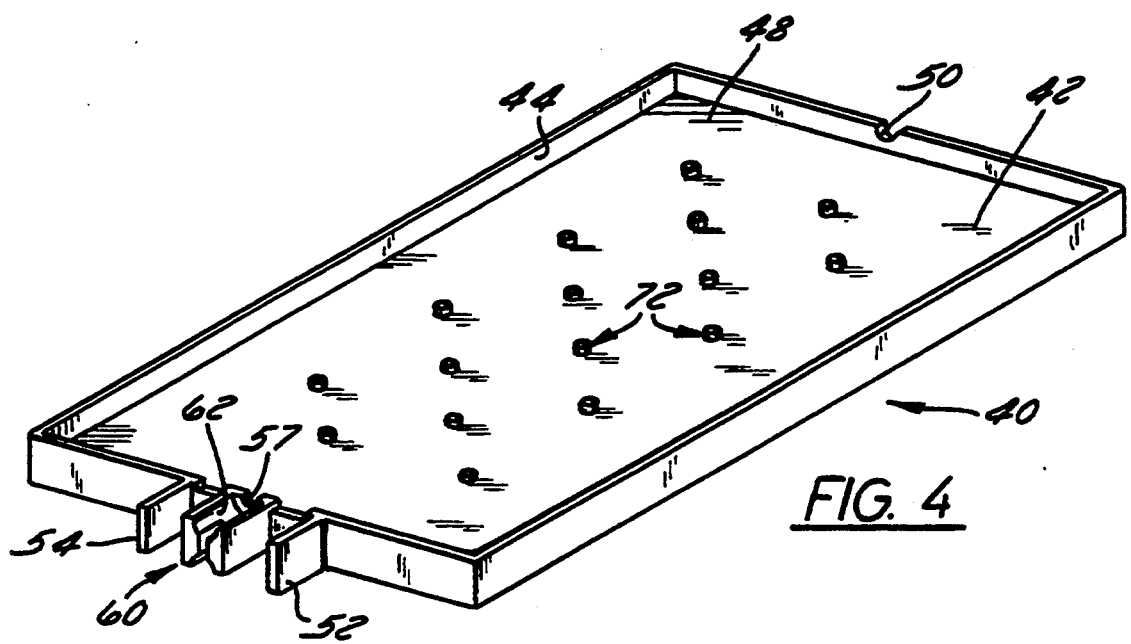
FIG. 4 is a perspective view of the opposite side of the intermediate partition shown in FIG. 3 and illustrating the sockets.

FIGS. 3 and 4 show reverse sides of the same element, i.e. partition 40. Partition 40 includes a flat plate 42 which in the illustrated embodiment is rectangular. A wall 44 surrounds plate 42 and extends on both sides thereof. For purposes of discussion, FIG. 3 will be referred to as the top view, while FIG. 4 will be referred to as the bottom view. The top side of plate 42 is given the reference numeral 47, while the bottom side of plate 42 is given the reference numeral 48.

Wall 44 includes a pair of spaced apart, semicircular cutouts 49 and 50 at the center of one of its shorter sides, it being appreciated that when two partitions 40 are placed on top of one another (or a partition and a casing) the openings 49 and 50 will align to form a hole used for injection of electrolyte into the resulting cell. The hole is then plugged after electrolyte addition. At the opposite side of wall 44, a pair of parallel and spaced apart rectangular tabs 52 and 54 are provided. Tabs 52 and 54 are perpendicular to wall 44 and are spaced between the middle of that end and the corners of partition 40. Another pair of semicircular openings 55 and 57 are provided between tabs 52 and 54, these openings being combined with partitions or casings to form an opening for a vent tube shown in greater detail in FIG. 6. A vent cap cradle 60 is also located between tabs 52 and 54 on either side of openings 55 and 57. Cradle 60 includes a pair of semi-cylindrical elongate recesses 61 and 62, each designed, as will be more fully appreciated hereafter, for holding the rubber portion of the seal.

Partitions 40 also include a plurality of support members 65, shown in the illustrated embodiment to include generally cylindrical bodies 66 having conical points 67. Sixteen of the support members 65 are shown in the illustrated embodiment, but it should be appreciated that the number and spacing thereof may be varied. It is important, however, that the pattern for the support members 65 be such as to allow even support and compression of battery elements which will eventually be inserted into the cells. The shape of support member 65 can also vary and may include tapering, conical members or members with a square or rectangular cross-section, and the like. Support members 67 are perpendicular to and extend upwardly from side 47 to a level above the plane defined by the edge 70 of wall 44. They are preferably formed integrally with the other components of partition 40, such as by injection molding.

Another feature of partition 40 is illustrated in FIG. 4, i.e., sockets 72 for receiving the points of support members 65. The pattern and number thereof will obviously be consistent with the pattern on side 47. If the shape of the support members 65 is varied, the shape of sockets 72 would vary accordingly. The illustrated sockets are annular, as best seen in FIG. 5.

While not specifically illustrated, it should be appreciated that support members will be provided on bottom casing 12 and that sockets will be provided on top casing 11.

Figure 5:
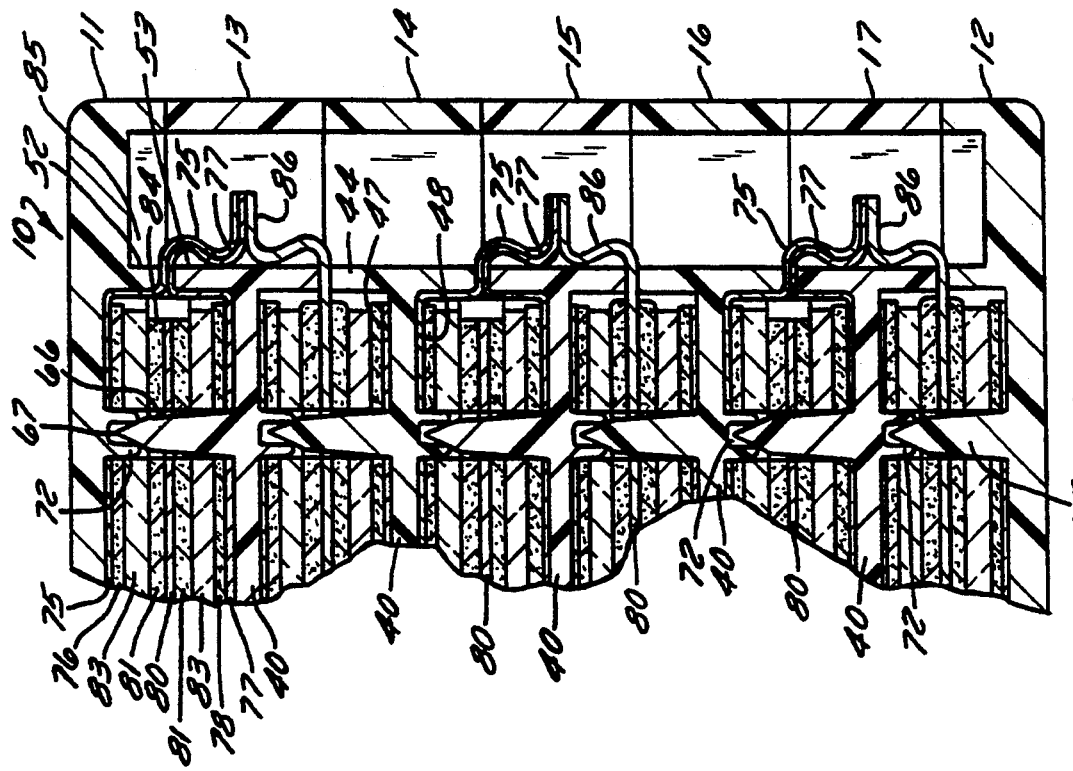
FIG. 5 is a partial cross-section taken along the line 5—5 of FIG. 2 showing internal battery components of the battery shown in FIG. 1.

Proceeding next to FIG. 5, the six cells of battery 10 are illustrated in partial cross-section. The individual cell components will be described for one cell in FIG. 5, and it should be understood by those reading the specification that the cell arrangements are the same in the other cells of battery 10. The upper cell of battery 10 includes a first electrode substrate 75, preferably being made from lead foil, for example lead foil having a thickness of less than about 0.05 inches. A thickness of about 0.01 inches is preferred. Negative paste material 76 is applied to foil 75, the paste being selected from those generally known in the lead-acid battery art. Another combination of a lead foil substrate 77 with negative active material 76 pasted thereover is located at the opposite side of the cell. At the center of the cell a positive electrode substrate 80 is shown, also preferably being made from lead foil. This electrode differs from the negative electrodes in that it is pasted on both sides with positive paste material 81. A glass mat separator 83 is disposed on either side of the positive paste 81.

It will be appreciated at the right side of FIG. 5 that the positive electrode is offset slightly to the left in alternating cells, as illustrated at reference numeral 84. This is to permit the negative plate foils 75 and 77 to pass between the tabs 52 or 54 and the channel 62, as illustrated at 85, i.e. a double layer lead foil. That double layer is joined to the single layer 86 of the positive electrode from the adjoining cell. Three such combinations exist on the side illustrated in FIG. 5 and two are present on the opposite side as will be appreciated from FIG. 2. Single foil connections are made to terminals 20 and 21. The connection of plates from adjacent cells in batteries, in and of itself, is well known and does not form part of the present invention.

Figure 6:
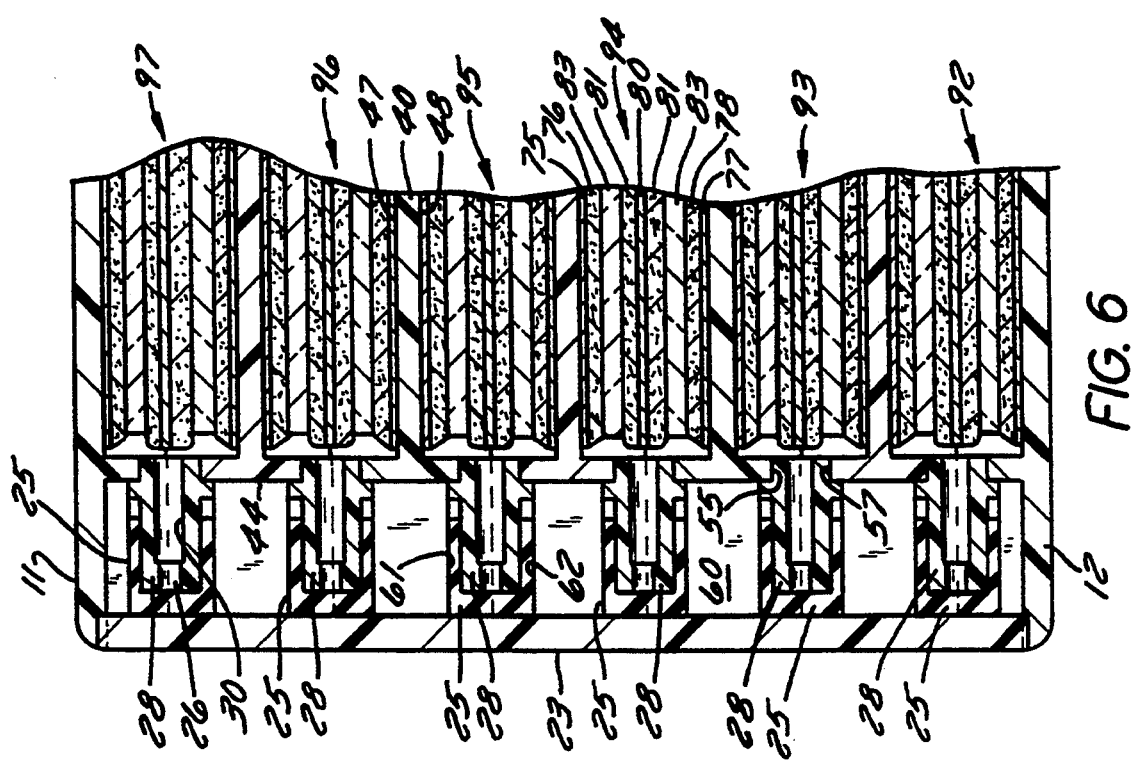
FIG. 6 is a partial cross-section taken along the line 6—6 of FIG. 2 showing the illustrative vent structure of the battery of FIG. 1.

The vent arrangement for battery 10 is best illustrated in FIG. 6, showing the rigid tube 28 which rests within the circular opening formed by matching openings 55 and 57 of adjacent partitions or top or bottom casings. Tube 28 opens to the interior of each cell and permits gases which are not absorbed to be vented to the atmosphere when the pressure within the cell exceeds a predetermined value. As previously mentioned, tube 28 includes a slot 26 at its end remote from the cell and a central aperture 30. The portion of tube 28 which is outside the cell is encased in a rubber cap 25, which rests in the semi-cylindrical portions 61-62 of cradle 60. The vents just described are urged against the end wall 44 of the partitions 40 by cap 23, illustrated in FIG. 1.

It will now be appreciated that battery 10 may be formed by the sequential buildup of individual cells starting, for example, with the placement of electrode elements 75-78 and 80-81 over support members 65 extending upwardly from lower casing 12. The electrode elements would be punched to accommodate the support members as is known from the '128 patent. The first partition 40 would then be placed over lower casing 12 so that the sockets 72 thereof fit over the tips 67 of the support members 65. Again, it should be mentioned that, while sockets are preferred, they are not required, and the tips of support members may be vibration welded to a flat surface of the partition. This will create a joint line 90 (see FIGS. 1 and 2) about the periphery of the battery 10 and fusion between the tips 67 and sockets 72. The next electrode grouping is placed over the support members 65 of the first partition 40 and another partition is placed thereover, so that its side 48 is downwardly directed and so that the socket 72 will receive the support members of the first partition. The welding and building process is continued until all cells have been completed by the addition and sealing of upper casing 11 to partition 13. For reference, the individual cells are numbered in FIG. 6 as cells 92 to 97. Electrolyte is added and the fill openings sealed. Following the formation of the inter-cell connections, the vents are then inserted and held in place by cap 23.

As previously mentioned the number of partitions and cells can vary widely and stacked batteries, such as battery 10, may be combined with similar batteries to provide batteries of even higher voltage and capacity.

Figure 7:
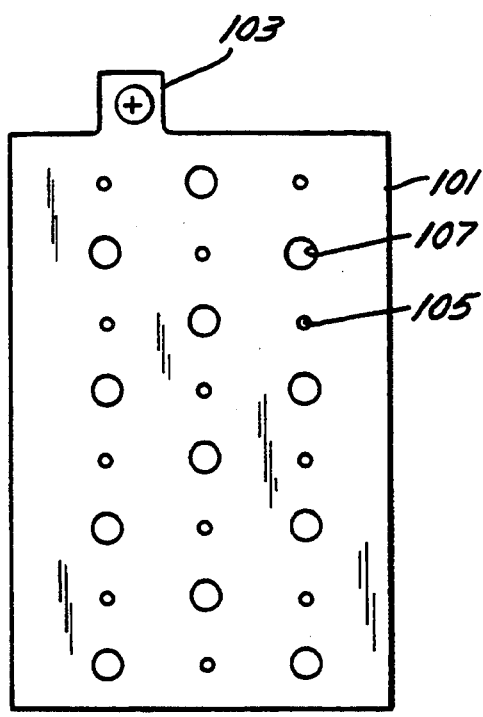
FIG. 7 is a top view of a positive plate prepared according to the most preferred form of the present invention and illustrating the alternating pattern of smaller and larger holes.
Figure 8:
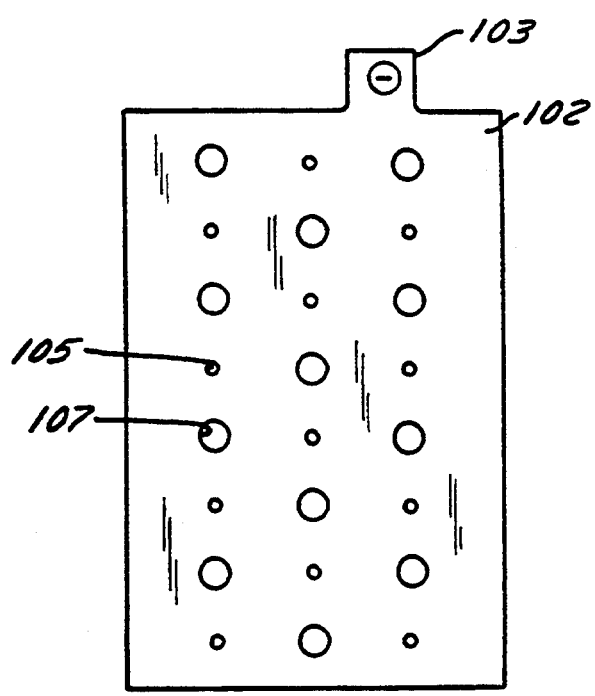
FIG. 8 is a top view of a negative plate prepared according to the most preferred form of the present invention and illustrates the alternating pattern of smaller and larger holes.

Another embodiment of the invention is illustrated in FIGS. 7 and 8. In these figures a positive electrode plate 101 and a negative electrode plate 102 (e.g. pasted foil) are shown in top view. Each of plates 101 and 102 includes lugs 103 such as those illustrated in FIG. 5, but these plates differ from the plates shown in the previous drawings in that they are designed for use with a support member system which includes twenty-four elements instead of the sixteen illustrated in FIG. 3. The unique feature of the plates shown in FIGS. 7 and 8 is that an alternating hole pattern is provided for each, including a series of small openings 105 and a series of larger openings 107. As can be noted from a comparison of the two figures, where a small hole 105 is provided in one of the plates, a larger hole 107 is provided for the other plate. In other words, if one plate were stacked on top of the other (with separator material therebetween) the small hole could be viewed through the larger hole 107. The use of plates 101 and 102 will eliminate the possibility of shorting along the support member, because the support members are of a diameter about the same as the diameter of the smaller holes. Therefore, the smaller holes serve to properly locate the plate over the support members, while the larger holes 107 will surround and be spaced apart from the outer circumference of the support member.

The illustrated plates are designed for use with pin-like support members such as those previously illustrated. The concept would work equally well if the support members were square or rectangular in cross section, with corresponding adjustment of the openings.

While the present invention has been described in connection with a preferred embodiment and an alternate embodiment for the electrode plates, the invention is not to be limited thereby but is to be limited solely by the scope of the claims which follow.

We claim:

1. A rechargeable battery comprising:
   a first end casing;
   a second end casing;
   at least one partition located between the end casings each partition having a pair of parallel and spaced apart surfaces abutting either an end casing or another partition, the abutment of two adjacent partitions, if there is more than one partition, and the abutment of a partition and each casing resulting in the creation of a cell so that at least two cells are present;
   battery electrode elements, separators and electrolyte located within each cell;
   each abutment being sealed; and
   a plurality of support members for maintaining a constant spacing between the electrode elements within each cell, the support members being attached to at least one of a partition or a casing and passing through the electrode elements.

2. The battery of claim 1 wherein each partition includes a flat plate and a wall surrounding the plate.

3. The battery of claim 2 wherein the wall extends perpendicularly from both sides of the plate.

4. The battery of claim 2 wherein a plurality of spaced-apart, elongate support members extend from one side of the plate.

5. The battery of claim 2 wherein a plurality of spaced-apart, elongate support members extend from one side of the plate and a plurality of spaced-apart receivers are located on the other side of the plate, the receivers being constructed and arranged to receive the ends of support members from another partition.

6. The battery of claim 4 wherein a plurality of spaced-apart elongate support members extend from one of the casings.

7. The battery of claim 5 wherein a plurality of spaced-apart receivers are located on one of the casings and are constructed and arranged to receive the ends of support members from a partition.

8. The battery of claim 4 wherein the support members are pins having a circular cross section and a pointed end.

9. The battery of claim 5 wherein the support members are pins having a circular cross section and a pointed end and the receivers are sockets.

10. The battery of claim 1 wherein the electrode elements include positive and negative electrode plates and separators therebetween, the electrode plates comprising conductive foil substrates pasted respectively with positive and negative active material.

11. The battery of claim 10 wherein the plates are punched to create openings to receive the support members and wherein the size of the openings is selected so that each support member will contact one polarity of plate, but not both.

12. The battery of claim 11 wherein the openings for each of the positive and negative discharge plates include smaller openings and larger openings, the openings being arranged such that when plates of opposite polarity are placed adjacent one another but separated by separator material, the smaller holes of the positive electrode plates will be aligned with the larger holes on the negative electrode plates.

13. The battery of claim 1 wherein each cell include a vent opening, a vent tube and an elastomeric vent cap.

14. The battery of claim 1 wherein the electrode elements within each cell include a pair of lead foils pasted with negative active material, a lead foil pasted on both sides with positive active material located between the negative active material and separators between each confronting pair of active material layers.

15. A battery cell comprising a casing including positive and negative electrode plates, separators and electrolyte and a plurality of support members passing from the casing through the electrode elements, and wherein the plates are punched with openings of two different sizes to receive support members, the size of the openings being selected so that each support member will contact at least one of first polarity plate, but not contact any plate of opposite polarity.

16. The cell of claim 15 wherein the openings for each polarity of plate include smaller openings and larger openings, the openings being arranged such that when plates of opposite polarity are placed together but separated by separator material, a small hole of one polarity plate will be aligned with a larger opening hole on a plate of opposite polarity.

17. The cell of claim 15 wherein the support members are pins, the casing includes parallel and spaced apart planar walls, and wherein the pins extend from one wall and are joined to the other wall.

18. The cell of claim 17 wherein sockets are formed on the other wall to receive the pins.

* * * * *